United States Patent
Tayar

(10) Patent No.: US 8,029,012 B2
(45) Date of Patent: Oct. 4, 2011

(54) DEVICE, SYSTEM AND METHOD FOR AUTOMATED TOW COUPLING

(76) Inventor: Eliahu Tayar, Moshav Ramat Tzvi (IL)

(*) Notice: Subject to any disclaimer, the term of this patent is extended or adjusted under 35 U.S.C. 154(b) by 504 days.

(21) Appl. No.: 11/966,075

(22) Filed: Dec. 28, 2007

(65) Prior Publication Data

US 2008/0157507 A1 Jul. 3, 2008

Related U.S. Application Data

(60) Provisional application No. 60/877,376, filed on Dec. 28, 2006.

(51) Int. Cl.
*B60D 1/36* (2006.01)

(52) U.S. Cl. ............... 280/508; 280/477; 280/490.1; 414/809

(58) Field of Classification Search .............. 280/508, 280/477, 490.1; 414/809
See application file for complete search history.

(56) References Cited

U.S. PATENT DOCUMENTS

| | | | |
|---|---|---|---|
| 4,431,207 A | 2/1984 | Langenfeld et al. | |
| 4,691,934 A | 9/1987 | Tomse | |
| 4,998,745 A | 3/1991 | David | |
| 5,261,687 A * | 11/1993 | Bergman | 280/478.1 |
| 5,573,263 A * | 11/1996 | Denny et al. | 280/509 |
| 6,193,259 B1 * | 2/2001 | Rupard | 280/508 |
| 6,594,924 B2 * | 7/2003 | Curtis | 37/231 |
| 7,258,354 B2 | 8/2007 | Kim et al. | |
| 7,264,260 B2 | 9/2007 | Overstreet | |
| 7,267,354 B2 | 9/2007 | Cunningham et al. | |
| 7,293,791 B1 | 11/2007 | Williams, Jr. | |
| 2003/0193167 A1 * | 10/2003 | Hall | 280/508 |

* cited by examiner

*Primary Examiner* — Paul N Dickson
*Assistant Examiner* — Jacob Knutson
(74) *Attorney, Agent, or Firm* — Pearl Cohen Zedek Latzer LLP

(57) ABSTRACT

A tow hook coupling device to automatically align and couple a tow hook of a first vehicle onto a female member of a second vehicle when the two vehicles are brought into proximity. The female member has a lateral attachment that is suitable to be grabbed by a hook, and the male member has a shaft, a hook connected to the shaft and an elevation guide extension. Upon contact of the guide extension with the lateral attachment, the shaft is raised to align the hook to couple with the lateral attachment.

20 Claims, 5 Drawing Sheets ns to provide a thorough understanding of embodiments of the invention. However it will be # DEVICE, SYSTEM AND METHOD FOR AUTOMATED TOW COUPLING

CROSS-REFERENCE FROM RELATED APPLICATION

This application claims the benefit of U.S. Provisional Patent Application 60/877,376 filed on Dec. 28, 2006 and entitled 'Device, System and Method for Towing a Vehicle', which is incorporated herein by reference in its entirety.

FIELD OF THE INVENTION

The present invention relates generally to towing vehicles, and particularly to a system, device and method of automatic coupling of a vehicle towing hook.

BACKGROUND OF THE INVENTION

Towing a stranded vehicle may entail a process of manually attaching a tow hook from the rescue vehicle to the stranded vehicle. Various situations may make it difficult, dangerous or impossible for a person to link a hook from a rescue vehicle onto a stranded vehicle. Such situations include for example a battlefield scene, a storm or flood area, an environmental hazard area, or other hostile or inconvenient areas whose conditions do not favor a person attaching a tow hook to a stranded vehicle.

SUMMARY OF THE INVENTION

Some embodiments of the invention may include a tow coupling system having a female member attached to a first vehicle, where the female member has a lateral attachment such as a cable, chain, bar or other sturdy item to be grasped by a hook, and a male member attached to a second vehicle, where the male member has a shaft, a hook connected to the shaft, and an elevation guide extension; such that when the guide extension comes into contact with the lateral attachment, the shaft is raised to align the hook to couple with the lateral attachment. In some embodiments, there may be included a chain connecting the hook to the male member, where the chain assumes an extended position after the hook is coupled to the lateral attachment, once the male member and the female member are drawn apart.

In some embodiments, the guide extension is connected to a distal end of the hook, and the guide extension extends upwards from the distal end at an angle of approximately 45° from an angle of the male member.

In some embodiments, the elevation guide curves in a convex configuration upwards from the hook.

In some embodiments, there may be a latch to assume an open position until the hook is coupled with the lateral attachment, and to assume a locked position once the hook is coupled to the lateral attachment.

In some embodiments, there may be included a hinge upon which the shaft pivots when an upward force is exerted upon the elevation guide, where the upward force is generated when the elevation guide contacts the lateral attachment.

Some embodiments may include an activator to align a height of the hook to a height of the lateral attachment.

Some embodiments may include a remote release trigger to release an end of the lateral attachment from the hook.

Some embodiments may include a release latch to detach the hook from the extension shaft when a pulling pressure is exerted on the hook.

Some embodiments may include an opposing hook extension of the hook, to direct the lateral attachment into a coupled position with the hook.

Some embodiments may include a height adjustment bracket, to adjustably positioning the hook at a height aligned with a height of the lateral attachment.

Some embodiments of the invention include a method of coupling a tow hook, where the method includes moving a female member of a first vehicle into contact with a male member of a second vehicle, exerting an upwards force on an elevation guide attached to the male member, where the upward force is generated by a contact of the elevation guide with the female member; securing a hook of the male member onto the female member; and releasing the hook from said male member, while the hook is tethered to the second vehicle by a chain.

In some embodiments, the first vehicle is the vehicle that moves.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, and components have not been described in detail so as not to obscure the embodiments of the invention.

Figure 1:
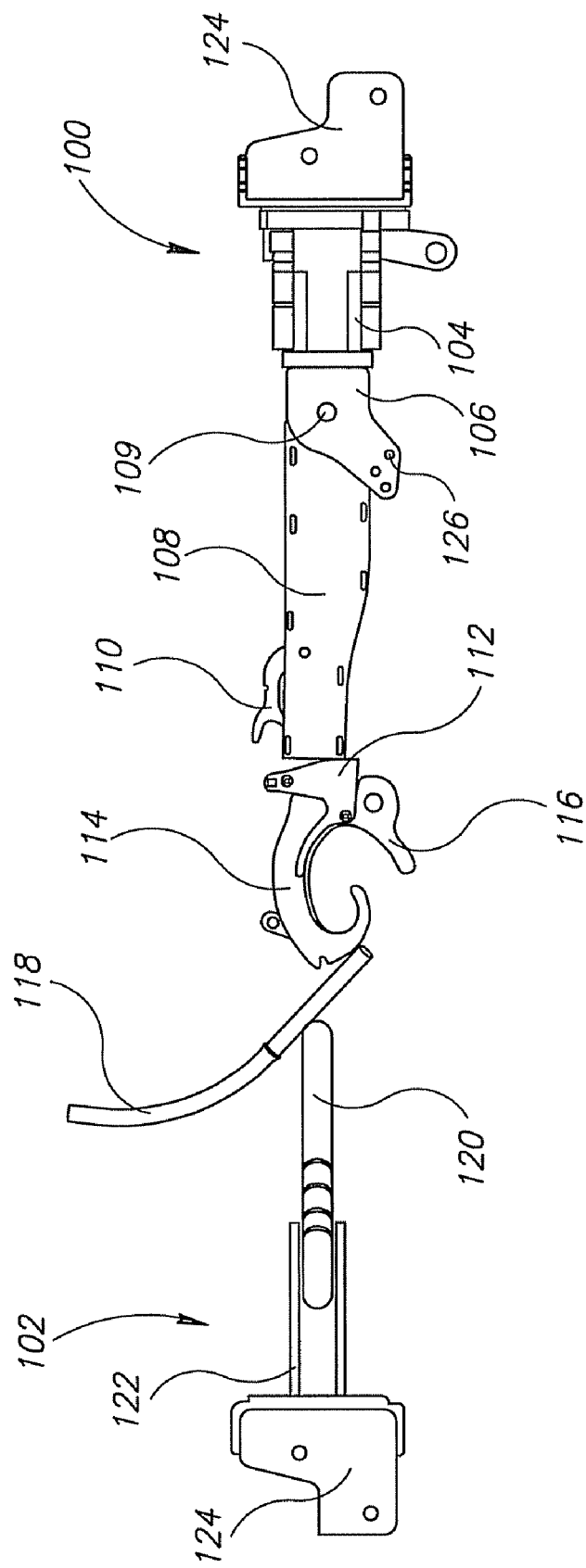
FIG. 1 is a diagram of a male member approaching a female member in accordance with an embodiment of the invention.

Reference is made to FIG. 1, a diagram of a second, or male, member 100 approaching a first, or female, member 102 in accordance with an embodiment of the invention. First and second members 102,100 are referred to as female and male members, respectively, because second member 100 fits into or grabs onto first member 102 for coupling thereof.

In some embodiments, one or both of male member 100 and female member 102 may be mounted on a vehicle, such that male member 100 may be mounted on a front or back of a first vehicle, and female member 102 may be mounted on a front or back of a second vehicle. Male member 100 may include a male mounting joint 104, a pivot housing 106, hinge or pivot 109, an arm or shaft 108, a release latch 110, a hook locking latch 112, a hook 114, an opposing hook extension 116 and an elevation guide extension 118. Female member 102 may include lateral attachment 120 and one or more mounting joints 122.

In some embodiments, one or more of male member 100 and female member 102 may be mounted on for example beam 124 or some other surface of edge of a vehicle such as for example a bumper, grill, hood or tail section of a vehicle.

In operation, one or both of male member 100 and female member 102 as may be mounted on one or more vehicles, may be moved into proximity of the opposing member. Elevation guide 118 which may extend from for example a distal end of hook 114, may contact lateral attachment 120, and may force shaft 108 upwards by for example raising or pivoting shaft 108 about pivot 109, so that hook 114 is raised above the height of lateral attachment 120. As male member 100 is moved closer to lateral attachment 120, lateral attachment 120 may be caught by opposing hook extension 116, and lateral attachment 120 then may be grabbed by and coupled into hook 114. Upon such coupling, hook locking latch 112 may closed to secure lateral attachment 120 into hook 114. In some embodiments, male member 100 may automatically couple with female member 102 when one or more of the vehicles to which they are attached are moved in to proximity of each other, and without the need for manual attachment of a hook to another vehicle.

In some embodiments, elevation guide 118 may be attached to or protrude from a distal end of shaft 108, such as from a distal end of hook 114. Elevation guide 118 may be angled relative to shaft 108, for example at approximately 45°, and may be positioned in, for example, a convex configuration relative to the position of shaft 108. Other angles, either smaller or larger, may be possible. At such position, the oblique contact of elevation guide 118 with lateral attachment 120 will elevate shaft 108 over lateral attachment 120 to align hook 114 and raise hook 114 to catch lateral attachment 120. An end of elevation guide 118 may be convexly curved relative to the direction of shaft 108, to for example prevent it from becoming tangled or caught on the vehicle having the female member 102.

In some embodiments, a proximate end of shaft 108 may be fitted into pivot housing 106, and a pin or pivot 109 may be threaded through a hole in pivot housing 106 and through the proximate end of shaft 108 so that shaft 108 may be raised relative to beam 124 by the force exerted from the contact of elevation guide 118 with lateral attachment 120.

In some embodiments, the position or starting angle of shaft 108 relative to beam 124 may be selectively set by a pin threaded through one of the paired holes 126 in pivot housing 106. Such pin may be threaded underneath shaft 108 so that shaft 108 may rest on top of the pin threaded through paired holes 126, and shaft 108 may be set at an angle relative to beam 124 so as to match an approximate or estimated height of lateral attachment 120. In some embodiments, the initial angle dictated by hole 126 through which a pin is threaded may be set in advance of the coupling of the male member 100 to female member 102. In some embodiments, a mechanical or other activator may raise or lower one or more of an angle of shaft 108, mounting joint 104, beam 124, or lateral attachment 120. In some embodiments, a mechanical or electrical activator or elevator that may be activated remotely, such as, for example, from an inside of a tow vehicle, may raise or lower shaft 108 to align it with an approximate level of female member 102.

In some embodiments, hook locking latch 112 may initially be in an open position and may snap closed or locked once hook 114 has coupled with lateral attachment 120 so that hook 114 and lateral attachment 120 remain coupled in use, such as during, for example, a towing procedure. In some example, a contact of lateral attachment 120 with hook locking latch 112 may cause the latch to snap closed. In some embodiments, a pulling force or pushing force exerted on hook 114 or shaft 108 by lateral attachment 120 may release and close latch 112 around lateral attachment 120. A spring may activate and release locking latch 112.

Figure 2:
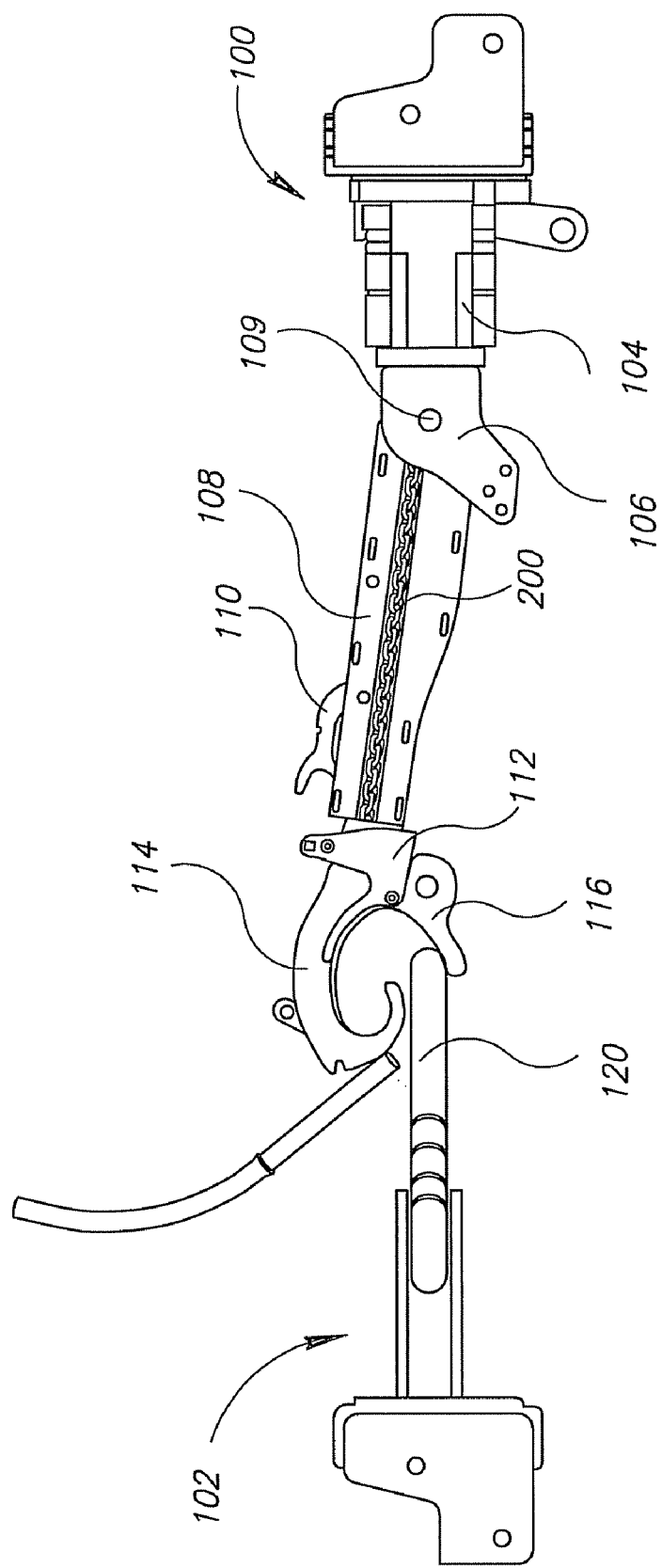
FIG. 2 is a diagram of a hook of a male member in position to lock onto a female member in accordance with an embodiment of the invention.

Reference is made to FIG. 2, a diagram of a hook of a male member 110 in an elevated position to lock onto a female member 102 in accordance with an embodiment of the invention. In this position, elevation guide 118 has passed over lateral attachment 120 and has caused shaft 108, and hook 114 which is attached or connected to it, to be raised above lateral attachment 120. Opposing hook extension 116 has caught lateral attachment 120. In some embodiments, the contact of lateral attachment 120 with hook locking latch 116, or alternatively a pulling force exerted on hook 114, may cause latch 112 to snap shut.

In some embodiments, a pulling force exerted on shaft 108, or a triggering of locking latch 116 or some other event may trigger an activation of release latch 110, which may separate hook 114 from shaft 108. In some embodiments, hook 114 may be connected to a chain 200 (shown in the cutaway view portion of shaft 108) which may, for example, connect hook 114 to, for example, the vehicle to which male member 100 is connected. Chain 200 may for example be retracted or loaded into a hollow space of arm 108, and may be extended once hook 114 couples with lateral attachment 120, and breaks away from shaft 108 when release latch 110 is released. In some embodiments, the extension of chain 200 may provide a towing vehicle with a length to accelerate before exerting a pulling force on the towed vehicle.

Figure 3:
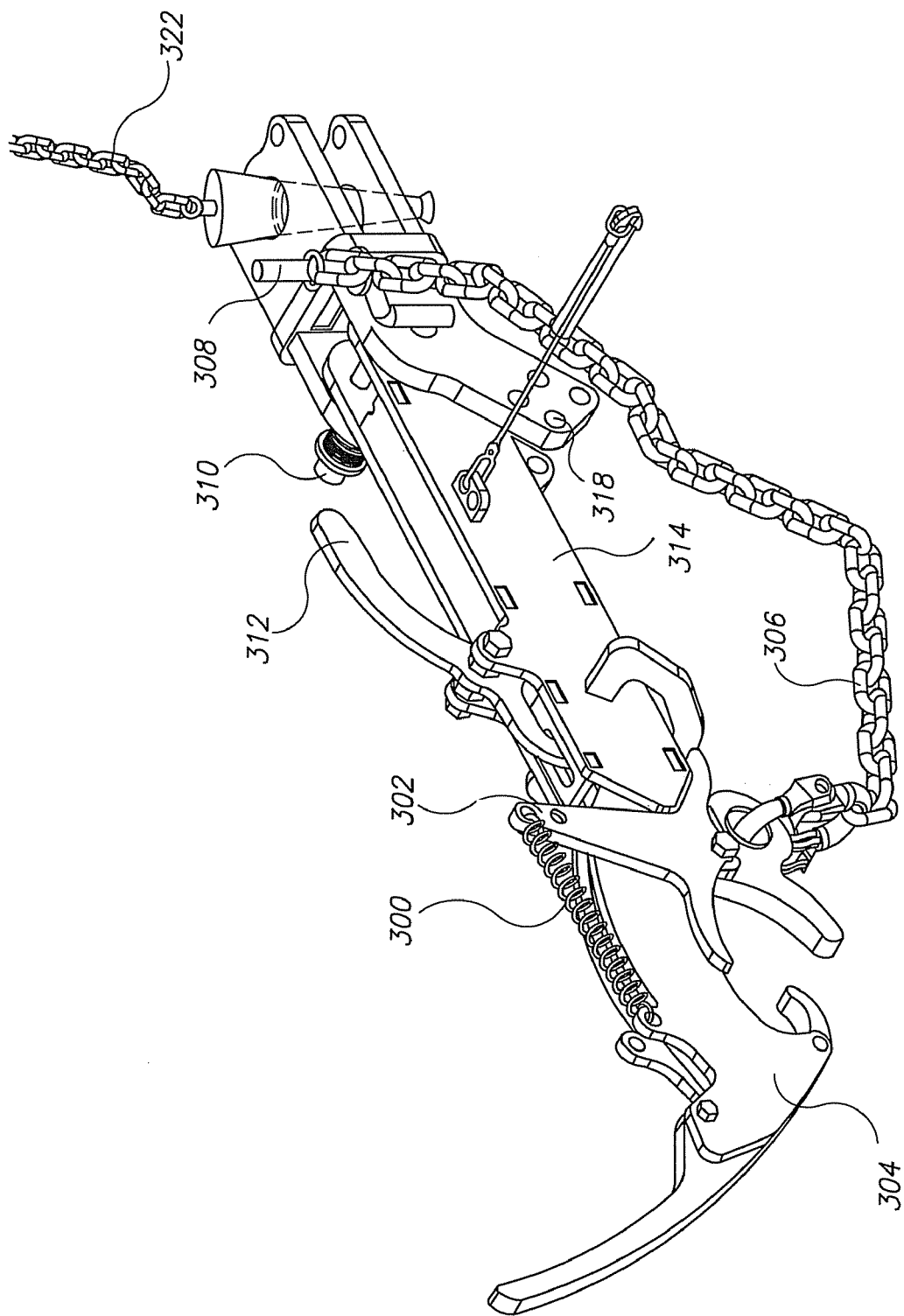
FIG. 3 is a diagram of a male member in accordance with an embodiment of the invention.

Reference is made to FIG. 3, a diagram of a male member 100 in accordance with an embodiment of the invention. In some embodiments, a spring 300 may force latch 302 to close once lateral attachment 120 is engaged with hook 304. Chain 306 may have been in a retracted state, such as wound around an upper portion of Z-tube 308 and connected to hook 304. Z-tube 308 may pivot forward when for example a pulling force is exerted on chain 306, and may release or spill the portion of chain 306 that is wound around tube 308. In some embodiments, tube 308 may be connected to pivot 310. In some embodiments, latch 312 may release hook 304 from shaft 314. In some embodiments, pin 316 may be inserted into one of paired holes 318 to raise or lower shaft 314 so as to set it at an initial angle relative to beam 124. In some embodiments, a pin 322 may lock a male mounting joint 320 connected to shaft 314 to a beam or item connected to a tow vehicle. In some embodiments, a line or other mechanism may be pulled from a remote location such as inside a tow vehicle to enable a remote disconnect of the male towing mechanism from a towing vehicle.

Figure 4:
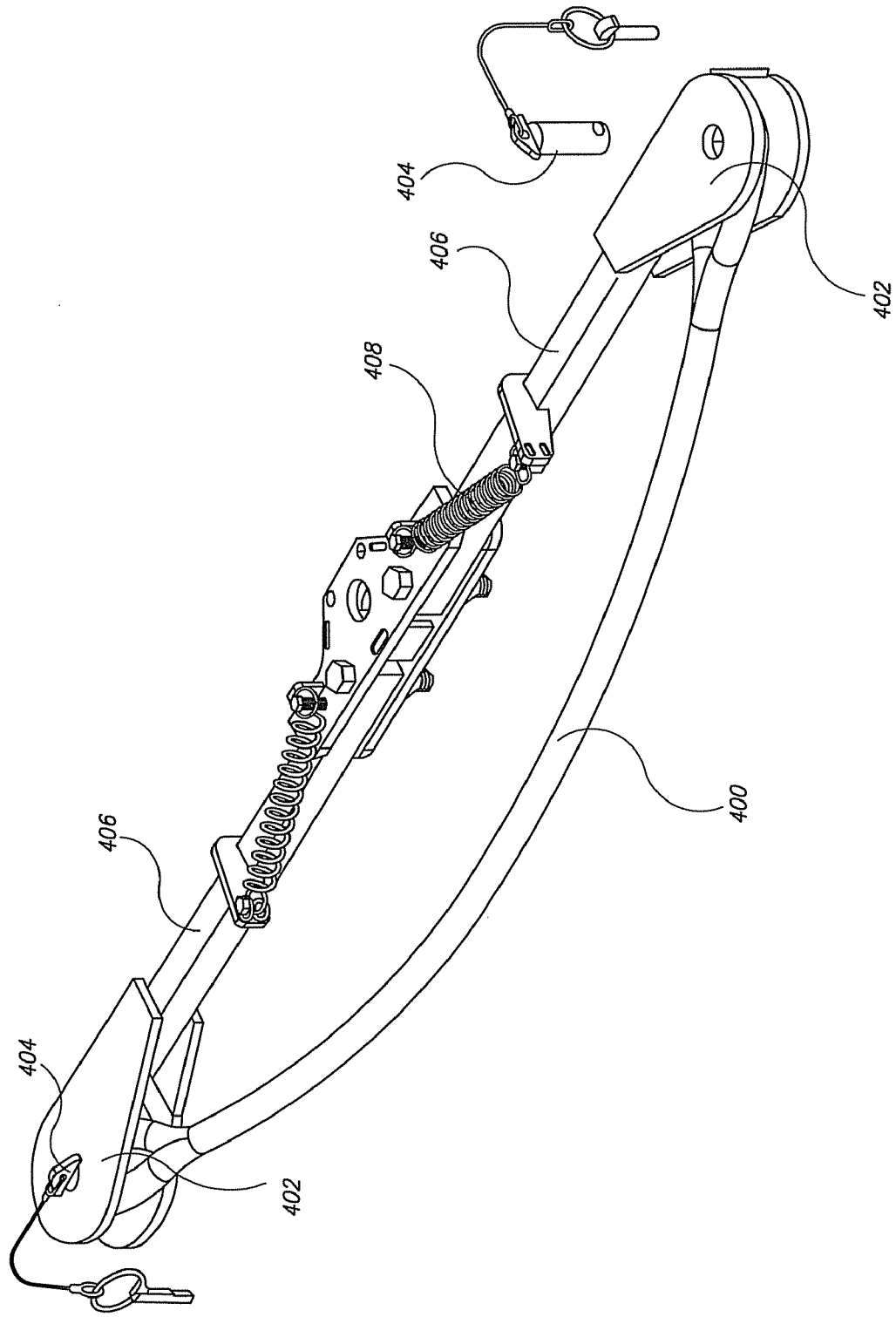
FIG. 4 is a diagram of a female member in accordance with an embodiment of the invention.

Reference is made to FIG. 4, a diagram of a female member in accordance with an embodiment. In some embodiments, lateral attachment 400 may be secured to end brackets 402 with one or more pins 404. One or more pins 404 may be pulled from a remote position to release or detach lateral attachment 400 from its connection with female member 102 so that hook and lateral attachment 400 may be disconnected when the towed vehicle is drawn away from the towing vehicle. In some embodiments, female member 102 may include two independently secured lateral rods 406 that may swing forward when a pulling force is exerted on lateral attachment 400, and may pull backward towards the female member by spring 408 is mounted when the pulling force ceases.

Figure 5:
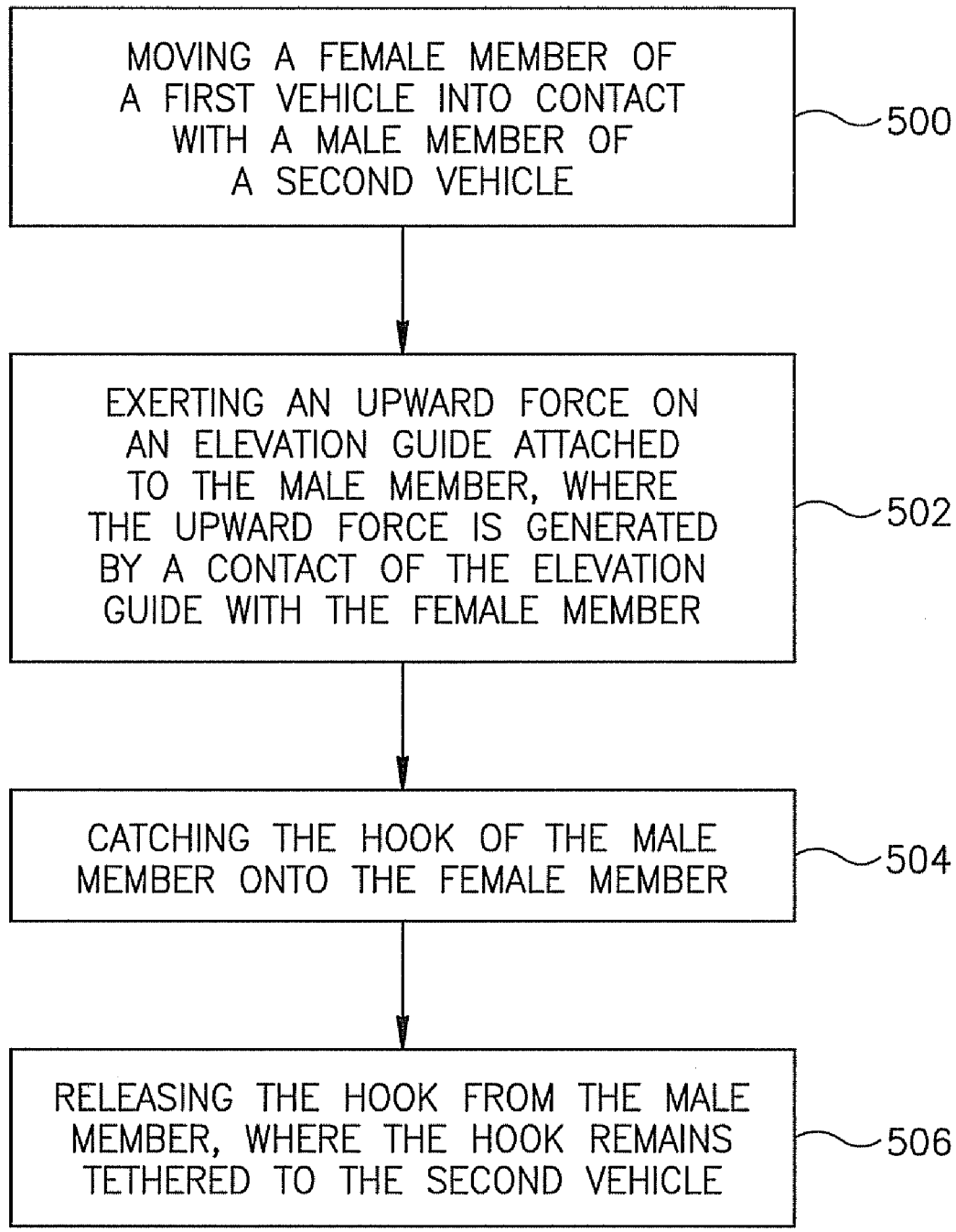
FIG. 5 is a flow diagram of a method in accordance with an embodiment of the invention.

Reference is made to FIG. 5, a flow chart of a method in accordance with an embodiment of the invention. In block 500, a female member of a first vehicle may be moved into contact with a male member of a second vehicle. In block 502, an upward force may be exerted on an elevation guide attached to the male member, where the upward force is generated by an oblique contact of the elevation guide with the female member. In block 504, a hook that may be connected to the male member be automatically coupled to the female member. In block 506, the hook may be released from the male member and remain tethered to the second vehicle by a chain.

It will be appreciated by persons skilled in the art that embodiments of the invention are not limited by what has been particularly shown and described hereinabove. Rather the scope of at least one embodiment of the invention is defined by the claims below.

The invention claimed is:

1. A tow coupling system comprising:
a first coupling member attached to a first vehicle, said first member comprising a lateral attachment; and
a second coupling member attached to a second vehicle, said second member comprising:
a mounting joint;
a shaft attached by a pivot to said mounting joint at a first distal end of said shaft;
a hook connected to said shaft at a second distal end of said shaft; and
an elevation guide extension extending from a distal end of said hook;
wherein upon contact of said guide extension with said lateral attachment, said hook is raised about said pivot above said lateral attachment to catch said lateral attachment by said hook.

2. The system as in claim 1, comprising a chain connecting said hook to said second member, said chain to assume an extended position after said hook is coupled to said lateral attachment and said second member and said first member are drawn apart.

3. The system as in claim 1, wherein said guide extension is connected to a distal end of said hook, and said guide extension extends upwards from said distal end at an angle of approximately 45° relative to said shaft 4. The system as in claim 1, wherein said elevation guide curves in a convex configuration upwards from said hook.

5. The system as in claim 1, comprising a latch to assume an open position until said hook is coupled with said lateral attachment, and to assume a locked position once said hook is coupled to said lateral attachment.

6. The system as in claim 1, comprising a hinge upon which said shaft pivots when an upward force is exerted upon said guide extension, said upward force generated when said guide extension contacts said lateral attachment.

7. The system as in claim 1, comprising an activator to align a height of said hook to a height of said lateral attachment.

8. The system as in claim 1, comprising a remote release trigger to release an end of said lateral attachment from said hook.

9. The system as in claim 1, comprising a release latch to detach said hook from said extension shaft when a pulling pressure is exerted on said hook.

10. The system as in claim 1, comprising an opposing hook extension of said hook, said opposing hook extension to direct said lateral attachment into a coupled position with said hook.

11. The system as in claim 1, comprising a height adjustment bracket, suitable for adjustably positioning said hook at a height aligned with said a height of said lateral attachment.

12. A tow coupling device comprising:
a mounting joint;
an elevation shaft attached by a pivot to said mounting joint at a first distal end of said shaft;
a hook connected to said shaft at a second distal end of said shaft; and
an elevation guide rod extending from a distal end of said hook;
wherein, upon contact of said elevation guide rod with a coupling member to which said hook is to couple, said elevation guide rod adjusts a height of said hook by raising said elevation shaft about said pivot to align said hook to catch said coupling member.

13. The tow coupling device as in claim 12, comprising a chain to connect said hook to a towing means, said chain to assume a retracted position until said hook is coupled with said coupling member, and to assume an extended position once said hook is coupled with said coupling member and a pulling force is exerted on said hook.

14. The tow coupling device as in claim 12, comprising a release latch to release said hook from said elevation shaft when a pulling force is exerted on said hook.

15. The tow coupling device as in claim 12, comprising a hinge upon which said elevation shaft pivots when an upward force is exerted upon said elevation guide rod.

16. A method of tow coupling comprising:
moving a first coupling member of a first vehicle into contact with a second coupling member of a second vehicle, wherein said first coupling member comprises a lateral attachment and said second coupling member comprises a mounting joint, an elevation shaft attached by a pivot to said mounting joint at a first distal end of said shaft and a hook connected to a shaft at a second distal end of said shaft;
exerting an upward force on an elevation guide extending from a distal end of said hook, said upward force generated by a contact of said elevation guide with said lateral attachment, thus raising said hook above said lateral attachment;
securing said hook of said second member onto said lateral attachment of said first member; and
releasing said hook from said second member, while said hook is tethered to said second vehicle by a chain.

17. The method as in claim 16, wherein said moving comprises moving said first vehicle.

18. The method as in claim 16, comprising extending said chain from a retracted position upon a exerting a pulling force on said hook.

19. The method as in claim 16, wherein said elevation guide is attached to said second member at an angle relative thereto, and said step of exerting an upward force on said elevation guide comprises moving said first member into contact with said elevation guide and exerting a horizontal force on said elevation guide.

20. The method as in claim 19, wherein said elevation guide is attached to said second member at an angle of approximately 45°, such that a horizontal force exerted on said elevation guide is translated into an upward force thereon.

* * * * *